US010951161B2

(12) United States Patent
Freeman et al.

(10) Patent No.: US 10,951,161 B2
(45) Date of Patent: Mar. 16, 2021

(54) CABLE INTEGRATED SOLAR INVERTER

(71) Applicant: Southwire Company, LLC, Carrollton, GA (US)

(72) Inventors: Brad Freeman, Palm Harbor, FL (US); Charles Hume, Parrish, FL (US); Dave Sykes, Pinellas Park, FL (US); Aldo Della Sera, Saint Petersburg, FL (US)

(73) Assignee: Southwire Company, LLC, Carrollton, GA (US)

( * ) Notice: Subject to any disclaimer, the term of this patent is extended or adjusted under 35 U.S.C. 154(b) by 477 days.

(21) Appl. No.: 15/383,647

(22) Filed: Dec. 19, 2016

(65) Prior Publication Data

US 2017/0179876 A1 Jun. 22, 2017

Related U.S. Application Data

(60) Provisional application No. 62/269,754, filed on Dec. 18, 2015.

(51) Int. Cl.
*H02J 3/38* (2006.01)
*H02M 7/5387* (2007.01)
*H02S 40/32* (2014.01)
*H02S 40/34* (2014.01)
*H02S 50/00* (2014.01)
(Continued)

(52) U.S. Cl.
CPC .......... *H02S 40/32* (2014.12); *H02J 3/38* (2013.01); *H02J 3/383* (2013.01); *H02J 3/40* (2013.01); *H02M 7/5387* (2013.01); *H02S 40/34* (2014.12); *H02S 50/00* (2013.01); *H02M 2001/007* (2013.01); *H02M 2001/0077* (2013.01)

(58) Field of Classification Search
USPC .......................................................... 307/77
See application file for complete search history.

(56) References Cited

U.S. PATENT DOCUMENTS

| 6,111,767 A | 8/2000 | Handleman et al. |
| 6,429,546 B1 | 8/2002 | Ropp et al. |
| 8,106,537 B2 | 1/2012 | Casey et al. |

(Continued)

FOREIGN PATENT DOCUMENTS

| AU | 201519555 A | 5/2015 |
| CA | 2906590 A1 | 9/2014 |

(Continued)

OTHER PUBLICATIONS

International Search Report and Written Opinion for corresponding International Application No. PCT/US2016/067556, dated Mar. 16, 2017, 15 pages.

(Continued)

*Primary Examiner* — Rexford N Barnie
*Assistant Examiner* — Xuan Ly
(74) *Attorney, Agent, or Firm* — Alston & Bird LLP (57) ABSTRACT

Systems for converting a standard direct current (DC) power from solar panels into a rectified DC power signal for further conversion into alternating current (AC) power are described herein. In some example embodiments, the systems may include distributed power converters and a grid interface unit connected by a trunk cable. In some example embodiments, the power converters may be embedded in the trunk cable.

18 Claims, 8 Drawing Sheets

(51) Int. Cl.
*H02J 3/40* (2006.01)
*H02M 1/00* (2006.01)

(56) References Cited

U.S. PATENT DOCUMENTS

| | | | |
|---|---|---|---|
| 8,134,820 | B1 | 3/2012 | Riccio et al. |
| 8,207,637 | B2 | 6/2012 | Marroquin et al. |
| 8,257,106 | B2 | 9/2012 | Fornage et al. |
| 8,410,950 | B2 | 4/2013 | Takehara et al. |
| 8,435,056 | B2 | 5/2013 | Fornage et al. |
| 8,472,220 | B2 | 6/2013 | Garrity et al. |
| 8,581,441 | B2 | 11/2013 | Rotzoll et al. |
| 8,626,616 | B2 | 1/2014 | Eich |
| 8,824,178 | B1 | 9/2014 | Baker et al. |
| 9,165,275 | B2 | 10/2015 | Fornage |
| 9,270,201 | B1 | 2/2016 | Potharaju |
| 9,750,102 | B1 | 8/2017 | Mao et al. |
| 10,523,117 | B2 | 12/2019 | Hume et al. |
| 2005/0128751 | A1 | 6/2005 | Roberge et al. |
| 2005/0200133 | A1 | 9/2005 | Wobben |
| 2006/0002110 | A1 | 1/2006 | Dowling et al. |
| 2008/0285317 | A1 | 11/2008 | Rotzoll |
| 2010/0066260 | A1 | 3/2010 | Newman, Jr. et al. |
| 2010/0071742 | A1 | 3/2010 | de Rooij et al. |
| 2010/0134959 | A1 | 6/2010 | Fife et al. |
| 2010/0141158 | A1 | 6/2010 | Newman, Jr. et al. |
| 2010/0145532 | A1 | 6/2010 | Gregory et al. |
| 2010/0263704 | A1 | 10/2010 | Fornage et al. |
| 2010/0289337 | A1* | 11/2010 | Stauth ............... H02J 3/385 |
| | | | 307/77 |
| 2010/0307479 | A1 | 12/2010 | Park |
| 2011/0061705 | A1* | 3/2011 | Croft ............... H02S 40/32 |
| | | | 136/244 |
| 2011/0090089 | A1 | 4/2011 | Luo |
| 2011/0121744 | A1 | 5/2011 | Salvestrini et al. |
| 2011/0202181 | A1 | 8/2011 | Lee et al. |
| 2011/0210611 | A1* | 9/2011 | Ledenev ........ H01L 31/02021 |
| | | | 307/71 |
| 2011/0225904 | A1 | 9/2011 | Railkar et al. |
| 2011/0248640 | A1 | 10/2011 | Welten |
| 2011/0273015 | A1* | 11/2011 | Adest ............ H01L 31/02021 |
| | | | 307/43 |
| 2011/0273016 | A1 | 11/2011 | Adest et al. |
| 2012/0019074 | A1 | 1/2012 | Frolov et al. |
| 2012/0080944 | A1 | 4/2012 | Recker et al. |
| 2012/0081934 | A1 | 4/2012 | Garrity et al. |
| 2012/0084027 | A1 | 4/2012 | Caine |
| 2012/0089260 | A1 | 4/2012 | Krohne et al. |
| 2012/0138123 | A1 | 6/2012 | Newdoll et al. |
| 2012/0175955 | A1 | 7/2012 | Carralero et al. |
| 2012/0175964 | A1 | 7/2012 | Yoscovich et al. |
| 2012/0248863 | A1 | 10/2012 | Adest et al. |
| 2012/0249150 | A1 | 10/2012 | Anissimov |
| 2012/0250372 | A1 | 10/2012 | Knill et al. |
| 2012/0310427 | A1 | 12/2012 | Williams et al. |
| 2012/0313443 | A1 | 12/2012 | Cheng et al. |
| 2013/0002031 | A1 | 1/2013 | Mulkey et al. |
| 2013/0012061 | A1 | 1/2013 | Rotzoll et al. |
| 2013/0021006 | A1 | 1/2013 | Fornage |
| 2013/0113291 | A1 | 5/2013 | Recker et al. |
| 2013/0241535 | A1 | 9/2013 | Magnussen et al. |
| 2013/0346054 | A1 | 12/2013 | Mumtaz |
| 2014/0077609 | A1 | 3/2014 | Fornage |
| 2014/0117769 | A1 | 5/2014 | Potharaju et al. |
| 2014/0191583 | A1 | 7/2014 | Chisenga et al. |
| 2014/0265585 | A1 | 9/2014 | Della Sera et al. |
| 2014/0266289 | A1 | 9/2014 | Della Sera et al. |
| 2014/0361695 | A1 | 12/2014 | Akiyama et al. |
| 2014/0376270 | A1 | 12/2014 | Kern et al. |
| 2015/0002040 | A1 | 1/2015 | Malyna et al. |
| 2015/0237700 | A1 | 8/2015 | Woytowitz |
| 2015/0244250 | A1* | 8/2015 | Toth ............... H02M 7/4807 |
| | | | 363/95 |
| 2016/0072396 | A1* | 3/2016 | Deboy ............ H02M 3/33592 |
| | | | 363/21.1 |
| 2016/0226252 | A1 | 8/2016 | Kravtiz et al. |
| 2017/0019960 | A1 | 1/2017 | Qu et al. |
| 2017/0027029 | A1 | 1/2017 | Hu et al. |
| 2017/0223807 | A1 | 8/2017 | Recker et al. |
| 2017/0231058 | A1 | 8/2017 | Sadwick |
| 2017/0238401 | A1 | 8/2017 | Sadwick et al. |

FOREIGN PATENT DOCUMENTS

| | | |
|---|---|---|
| CN | 202550576 U | 11/2012 |
| CN | 104158394 A | 11/2014 |
| EP | 2973976 B1 | 1/2016 |
| JP | H10174452 A | 6/1998 |
| JP | 2001238466 A | 8/2001 |
| WO | WO-2003/077398 A2 | 9/2003 |
| WO | WO-2012/170726 A2 | 12/2012 |
| WO | WO-2013/107782 | 7/2013 |
| WO | WO-2014/152765 A2 | 9/2014 |

OTHER PUBLICATIONS

Microchip Technology Inc. *Grid-Connected Solar Microinverter Reference Design Using a dsPIC® Digital Signal Controller*, AN1338 Technical Bulletin, Jul. 2010, 56 pages, retrieved from <http://ww1.microchip.com/downloads/en/AppNotes/01338D.pdf> on Jul. 22, 2016.

Roos et al., *Solar Electric System Design, Operation and Installation*, Washington State University Extension Energy Program, Oct. 2009, (35 pages). [Retrieved from the Internet Aug. 6, 2019] <www.energy.wsu.edu/Documents/SolarPVforBuildersOct2009.pdf>.

Vu, Trune-Kien et al., "A New Adaptive Dead-Time Compensation for Single-Phase Grid-Connected PV Inverter," Proceeding of 26th Annual Applied Power Electronics Conference and Exposition (APEC), Mar. 6, 2011, pp. 923-930, IEEE, U.S.

European Patent Office, Communication Pursuant to Rules 161(2) and 162 EPC for Application No. 14770361.5, dated Nov. 5, 2015, 2 pages, Germany.

European Patent Office, Extended European Search Report for Application No. 14770361.5, dated Nov. 24, 2016, 9 pages, Germany.

European Patent Office, Communication Pursuant to Rules 70(2) and 70a(2) EPC for Application No. 14770361.5, dated Dec. 13, 2016, 1 page, Germany.

European Patent Office, Communication Under Rule 71(3) EPC for Application No. 14770361.5, dated Nov. 14, 2018, 61 pages, Germany.

International Searching Authority, International Search Report and Written Opinion for International Application No. PCT/US2014/027708, dated Oct. 2, 2014, 24 pages, United States Patent and Trademark Office, U.S.A.

International Bureau of WIPO, International Preliminary Report on Patentability for International Application No. PCT/US2014/027708, dated Sep. 15, 2015, 22 pages, Switzerland.

International Searching Authority, International Search Report and Written Opinion for International Application No. PCT/US2016/016059, dated Jun. 27, 2016, 14 pages, The Netherlands.

International Searching Authority, International Search Report and Written Opinion for International Application No. PCT/US2017/060428, dated Feb. 7, 2018, 15 pages, European Patent Office, The Netherlands.

United States Patent and Trademark Office, Office Action for U.S. Appl. No. 14/211,693, dated Mar. 11, 2016, 7 pages, U.S.A.

United States Patent and Trademark Office, Office Action for U.S. Appl. No. 14/211,693, dated Dec. 29, 2016, 8 pages, U.S.A.

United States Patent and Trademark Office, Office Action for U.S. Appl. No. 14/211,693, dated Apr. 21, 2017, 12 pages, U.S.A.

United States Patent and Trademark Office, Office Action for U.S. Appl. No. 16/100,961, dated Mar. 22, 2019, 19 pages, U.S.A.

United States Patent and Trademark Office, Office Action for U.S. Appl. No. 15/383,647, dated May 1, 2019, 12 pages, U.S.A.

United States Patent and Trademark Office, Notice of Allowance for U.S. Appl. No. 14/058,270, dated Sep. 23, 2016, 12 pages, U.S.A.

(56) References Cited

OTHER PUBLICATIONS

United States Patent and Trademark Office, Corrected Notice of Allowability for U.S. Appl. No. 14/058,270, dated Dec. 28, 2016, 3 pages, U.S.A.
United States Patent and Trademark Office, Office Action for U.S. Appl. No. 14/612,159, dated Jan. 3, 2017, 17 pages, U.S.A.
United States Patent and Trademark Office, Notice of Allowance for U.S. Appl. No. 15/425,767, dated Sep. 14, 2018, 13 pages, U.S.A.
U.S. Appl. No. 61/270,809, "Method and System for Locating Stolen Solar Power System Components", Unpublished (filed Jul. 14, 2009), (Martin Fronage, Inventor and Assignee), (32 pages).
Argentine Patent and Trademark Office, Office Action for English Argentine Patent Application No. 20140101267, dated Mar. 11, 2019, 5 pages, Argentina.
Mexican Patent Office, Office Action for Mexican Patent Application No. MX/a/2015/012438, dated Dec. 4, 2017, 2 pages, Mexico.
Mexican Patent Office, Notice of Allowance for Mexican Patent Application No. MX/a/2015/012438, dated Jun. 11, 2018, 1 page, Mexico.
Chilean Patent and Trademark Office, Written Opinion for Chilean Patent Application No. 201502718, dated Jan. 15, 2018, 11 pages, Chile.

\* cited by examiner

CABLE INTEGRATED SOLAR INVERTER

CROSS-REFERENCE TO RELATED APPLICATIONS

This application claims priority from provisional U.S. Application No. 62/269,754 entitled "Cable Integrated Solar Inverter," which was filed on Dec. 18, 2015, which is herein incorporated by reference in its entirety.

BACKGROUND

Photovoltaic (PV) cells are currently used to harvest solar energy for use in both commercial and residential environments. To enable more widespread adoption of solar power, however, it is important to minimize the cost per watt for the power harvested. This requires all elements of a solar power system to be designed with both cost and system energy requirements taken into account. As solar power systems comprise several components in addition to the PV cell, development of these components also affects the evolution of the entire solar power system.

In order to produce power useable for most purposes, the direct current (DC) produced by a PV cell must be converted to alternating current (AC) having the frequency of the local utility. This conversion is typically accomplished by an inverter. A stand-alone inverter is used in totally isolated systems that normally do not interface with the utility grid. More sophisticated inverters convert the DC to AC at the utility frequency and ensure maintaining the AC inverter output in phase with the utility grid AC phase.

As the DC to AC conversion of power harvested from PV cells is a necessary function of solar power systems, there is on-going need in the art to reduce the cost associated with inverter systems, their installation, and long-term maintenance.

BRIEF SUMMARY

Various embodiments of the present invention are directed to an improved solar inverter system for generating AC power from photovoltaic solar panels or other DC power sources. In various embodiments, a cable integrated solar inverter is provided for converting DC power from solar modules to AC power for supplying a grid. In one embodiment, power converter cartridges are integrated into trunk cable and connected to solar panels. The power converter cartridges are connected in series via the trunk cable, which then provides the combined output from the plurality of power converters to a grid interface unit. In one embodiment, the grid interface unit receives a rectified (half-sine) wave and converts the rectified wave into a pure AC signal. According to various embodiments, the grid interface unit may include fault detection systems, monitoring systems, synchronization systems, unfolding circuitry, interface and communication circuitry and/or the like.

Particular embodiments of the subject matter described herein can be implemented so as to realize one or more of the following advantages: allow for embedding and/or incorporating power converters and/or converter circuitry within a cabling system and for more efficient power conversion from solar energy systems; reduce the cost and resources required for installing and maintaining solar energy systems; provide an easy to service system improving the user experience of customers and service personnel; eliminate unnecessary service interruptions; and provide a more efficient and improved optimization process and capabilities.

The details of one or more embodiments of the subject matter described herein are set forth in the accompanying drawings and the description below. Other features, aspects, and advantages of the subject matter will become apparent from the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Figure 1A:
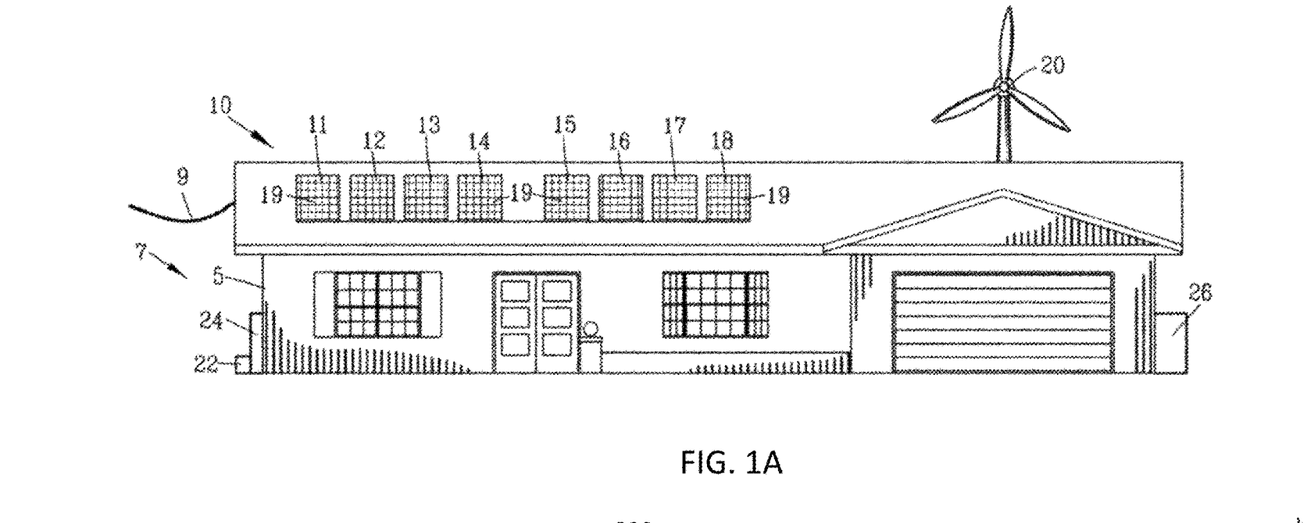
FIG. 1A shows a residential environment having a photovoltaic power system according to one embodiment.

According to various embodiments, a cable integrated solar inverter system is provided for converting DC power received from photovoltaic cells into AC power suitable for supply to a power grid. The cable integrated solar inverter system can be used in conjunction with a variety of photovoltaic power systems, including systems in both commercial and residential environments. As an example, FIG. 1A shows a building structure 5 having a photovoltaic power system interconnected with an AC power grid 9. In the illustrated embodiment, the photovoltaic power system includes a photovoltaic solar array 10. In particular, the solar array 10 is configured to generate power in combination with a wind turbine 20, which can be stored in an energy storage unit (e.g., comprised of the illustrated battery array 22 and a fuel cell array 24). In the illustrated embodiment, a fuel operated generator 26 is also provided for emergency operation.

The photovoltaic solar array 10 of FIG. 1A comprises a plurality of photovoltaic solar panels 11-18. Although the building structure 5 has been shown as a residential building structure, it should be understood that the photovoltaic solar array 10 may be mounted on virtually any type of building structure or on a ground surface. In one embodiment, each of the plurality of photovoltaic solar panels 11-18 is made from a multiplicity of photovoltaic solar cells 19. Each of the photovoltaic solar cells 19 may generate, for example, approximately 0.5 volts. When connected in series—parallel, the cells 19 together may provide, for example, approximately 300 watts of power at 30 volts. In some instances, individual photovoltaic solar panels 11-18 are mounted on equatorial mounts (not shown) for following the movement of the sun throughout the day.

Figure 1B:
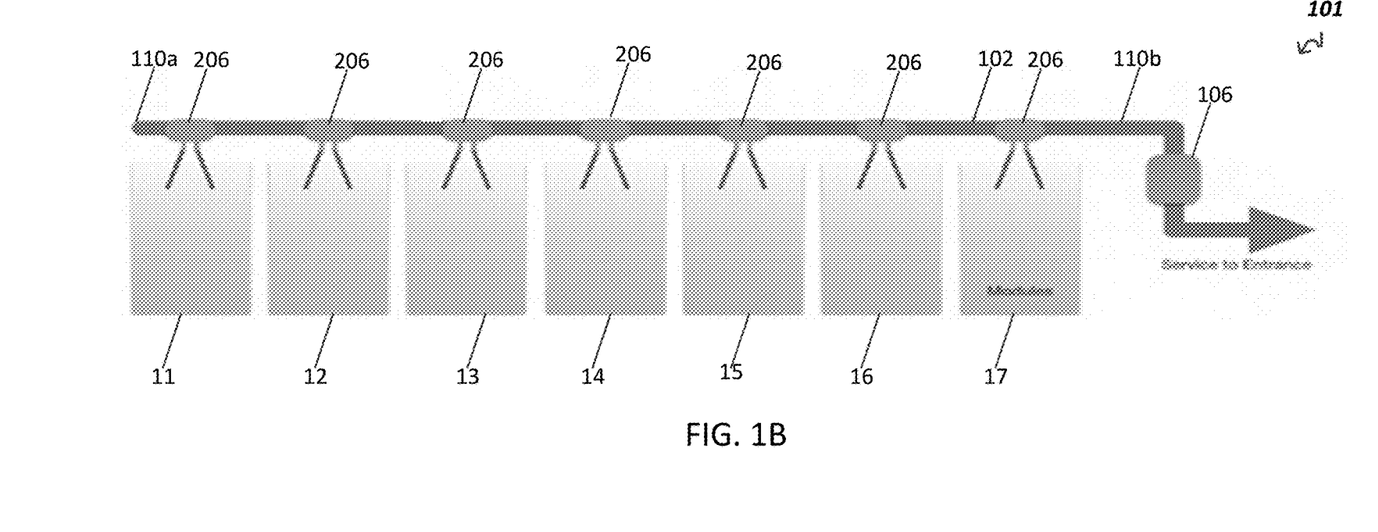
FIG. 1B is shows a schematic of a cable integrated solar inverter system according to one embodiment.

FIG. 1B shows a schematic diagram of a cable integrated solar inverter system 102 according to one embodiment. In the illustrated embodiment, the cable integrated solar inverter system 101 includes a trunk cable 102, a plurality of distributed power converters 206, each distributed along the trunk cable 102, and a grid interface unit 106. As shown in FIG. 1B, the power converters 206 are each electrically connected to one of a plurality of photovoltaic modules 11-18. The power converters 206 are also connected to one another in series via the trunk cable 102. As explained in greater detail herein, the power converters 206 are each configured to function as a half-sine wave power converter. In operation, the power converters 206 convert DC power received from the photovoltaic modules 11-18 into rectified half-sine wave signals, which are added and delivered to the grid interface unit 106 via the trunk cable 102. The grid interface unit 106 then converts the signals received from the power converters 206 into a full AC sine-wave power signal suitable for delivery to a power grid.

As shown in FIG. 1B, the power converters are integrated into the trunk cable 102, which connects the power converters 206 in series. As an example, in one embodiment the trunk cable 102 comprises a 30-ampere rated AC cable. The trunk cable 102 extends between the integrated power converters 206, which can be embedded, enclosed, or otherwise integrated into the cable in a variety of ways.

In some embodiments, trunk cable ends 110a and 110b are both connected to grid interface unit 106. In other embodiments, trunk cable end 110b is connected to grid interface unit 106 and terminal 110a is terminated.

In some embodiments, grid interface unit 106 includes elements that are not required to be in close proximity to photovoltaic modules 11-18. For example, the grid interface unit 106 may include fault detection systems, monitoring systems, synchronization systems, unfolding circuitry, interface and communication circuitry and/or the like. In one embodiment, the grid interface unit 106 supplies the grid with AC power. The distributed power converter system is configured for converting DC Power (e.g., produced by solar panels and/or photovoltaic panels) into AC power suitable for supplying a power grid. The power converters 206 are connected in series to one another and each power converter is connected to a photovoltaic panel.

Figure 2A:
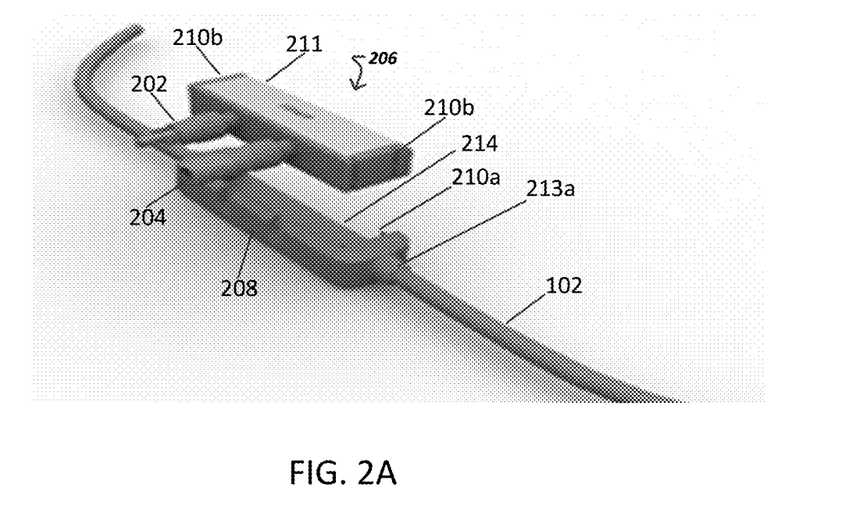
FIG. 2A shows an isometric view of a power converter cartridge and housing in which the power converter cartridge is detached from the housing according to one embodiment.

As one example, FIG. 2A shows an isometric view of a cable integrated distributed power converter according to one embodiment. In the illustrated embodiment, to facilitate ease of maintenance and replacement of faulty devices, the power converter 206 comprises a removable cartridge 211 that can be selectively removed from the trunk cable 102. In particular, as shown in FIG. 2A, the power converter cartridge 211 is configured to be selectively secured to a housing 208. According to various embodiments, the housing 208 may be constructed from a thermally conductive material (e.g., metals, metal alloys, thermally conductive plastic, a combination of plastics and metals and/or the like). For example, the housing 208 may be constructed from thermally conductive plastic and include a metal heat-sink. Likewise, the power converter cartridge 211 may be constructed from similar thermally conductive materials and in similar manner.

As shown in FIG. 2A, the housing 208 is a generally rigid member defining a generally horizontal, flat base and a central recessed area 214 configured for receiving the removable power converter cartridge 211. Opposing ends of the housing 208 are attached to the trunk cable 102. For example, in the illustrated embodiment, the trunk cable 102 is secured to the housing 208 in a weather-proof manner (e.g., via weather-proof rubber grommets 213a, 213b, or by overmolding the housing onto the trunk cable).

In the illustrated embodiment, the power converter cartridge 211 defines a generally rigid exterior shell configured for insertion into the recessed area 214 of the housing 208. As explained in greater detail below, the power converter's electronic components are sealed within the cartridge 211 and thereby shielded from outside weather. As shown in FIG. 2A, the power converter cartridge 211 includes positive and negative terminals 202, 204 configured for connection to the photovoltaic modules 11-18. In particular, the terminals 202, 204 enable the power converter 206 to receive DC power from the photovoltaic modules 11-18, which the power converter 206 then converts into a rectified half-sine signal as described below.

The power converter cartridge 211 also includes connection terminals 210b on its opposing ends for providing an electrical connection between the power converter cartridge 211 its housing 208. As shown in FIG. 2A, the housing 208 includes corresponding connection terminals 210a, which protrude inwardly into the housing's recessed area 214. As such, the power converter cartridge's connector terminals 210b are conductive cavities configured for reviving the housing's connector terminals 210a. In the illustrated embodiment, the connecters 210a and 210b help secure the power converter cartridge 211 in housing 208. Moreover, in the illustrated embodiment, the power converter cartridge 211 and housing 208 each include two connecters. However, in various other embodiments, the power converter cartridge 211 and housing 208 include a single connector or multiple connecters (e.g., three connecters, four connecters, five connecters and/or the like). In further embodiments, the connecters may comprise flat electrical contacts that are merely in contact with one another.

According to certain embodiments, the electrical connectors are configured to provide dedicated electrical connections between the power converter 206, adjacent power converters 206, and the above-described grid interface unit 106. For example, in one embodiment, the electrical connectors comprise a power connection line, a fault detection line, and a synchronization line between the power converters 206 and grid interface unit 106.

Figure 2B:
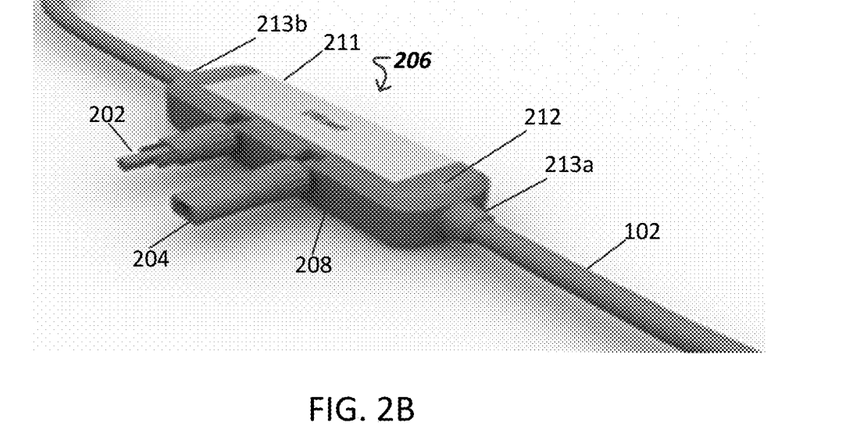
FIG. 2B shows an isometric view of the power converter cartridge and housing of FIG. 2A in which the power converter cartridge is secured to the housing.

As noted above, the power converter cartridge is configured to be removably secured within the housing 208. FIG. 2B shows the power converter cartridge 211 secured within housing 208. According to various embodiments, the housing 208 may include a latch or other fastening device (not shown) for securing and/or releasing the power converter cartridge. In other embodiments, the shape of the housing 208 facilitates the power converter cartridge 211 snapping in place when inserted into the housing.

In certain embodiments, power converters 206 may include a light emitting diode (LED) to indicate that status of the power converter. For example, the LED may display a green light if the power converter is properly secured in place. Alternatively, the LED may display a red light if the power converter is loose and/or not properly secured within housing 208. Additionally, power converters 206 may be configured to measure the amount of power being outputted by the power converter and display the measurement as an LED output. For example, the LED be configured to flash up to 10 times where each flash represents a percentage of measured power output compared to total power output. For example, 2 flashes corresponds to a measurement of 20 percent of total power output up and 9 flashes corresponds to 90 percent of total power output for the power converter As explained below, the power converter 206 electronics are contained within the power converter cartridge 211. In certain embodiments, when the power converter cartridge 211 is removed from the housing 208, a jumper cartridge may be inserted to bridge the gap left by the power converter cartridge. In other embodiments, a set of connectors may be provided to connect the power converter to the cable. The connectors left on the cable after removal of the power converter can then be directly connected together, thereby connecting the gap left from removal of the converter. Moreover, when a power converter 206 is determined to be faulty, it may be easily replaced by inserting a new power converter cartridge 211 into a respective housing 208.

As will be appreciated from the description herein, in one embodiment, each of the power converters 206 shown in FIG. 1B may take the configuration shown and described with respect to FIGS. 2A and 2B. In particular, the cable integrated solar inverter system may comprise numerous power converters 206 (e.g., 10 power converters) spread evenly along a length of the trunk cable 102 in order to facilitate ease of connection to photovoltaic modules. However, as will be appreciated from the description herein, in various other embodiments the power converters 206 may not be integrated directly into the trunk cable 102. In such embodiments, the power converters may be configured such that individual sections of trunk cable can be removably secured to each power converter 206. In this configuration, the trunk cable 102 is comprised of numerous sections of cable.

Figure 3:
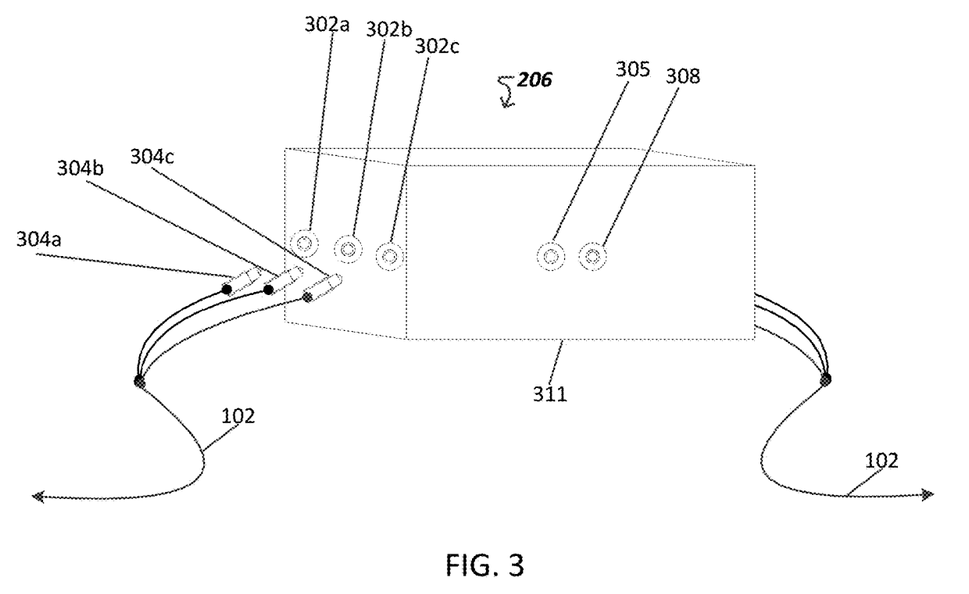
FIG. 3 shows isometric view of a cable integrated power converter according to another embodiment.

As another example, FIG. 3 shows an isometric view of a cable integrated power converter according to another embodiment. In the illustrated embodiment of FIG. 3, the power converter's electronics are contained within a housing 311, which may be sealed for weather proofing. The power converter's housing includes positive and negative terminals 305, 308, which are configured to enable the power converter to be connected to a photovoltaic module. The housing 311 also includes terminals 302a, 302b, and 302c disposed on its opposing ends. The terminals 302a, 302b, and 302c configured to provide a detachable electrical connection with the trunk cable 102 at both ends of the housing 311. For example, as shown in FIG. 3, the trunk cable 102 includes corresponding connection terminals 304a, 304b, and 304c. The opposite end of the power converter 206 (obstructed from view in FIG. 3) is connected to a second section of the trunk cable 102 in the same fashion.

In one embodiment, the corresponding pairs of power converter and trunk cable connection terminals 302a/304a; 302b/304b; and 302c/304c are configured to provide dedication electrical connections between the power converter 206, adjacent power converters 206, and the above-described grid interface unit 106. For example, in one embodiment, the terminals 302a/304a connect a power connection line, the terminals 302b/304b connect a fault detection line, and the terminals 302c/304c connect a synchronization line, each of which is established between the power converters 206 and grid interface unit 106. As will be appreciated from the description herein, the terminals 302a/304a, 302b/304b, and 302c/304c may be integrated into a single multi-pin interface.

With respect to the illustrated embodiment of FIG. 3, a faulty power converter 206 may be replaced by disconnecting the trunk cable 102 from the power converter 206 and connecting the trunk cable 102 to a new power converter 206 of the same type. As a result, the practical operation of the cabling system of FIG. 3 is similar to the operation described above with reference to FIG. 2A and FIG. 2B.

The illustrated housing 311 may be an expanded housing configured to house two or more power converters 206. In this embodiment, each of the connections 304a-304c would be repeated such that each of the two or more power converters 206 has a dedicated connection to the trunk cable. In some examples of this embodiments, the two or more power converters 206 in the expanded housing would share a controller.

Figure 4A:
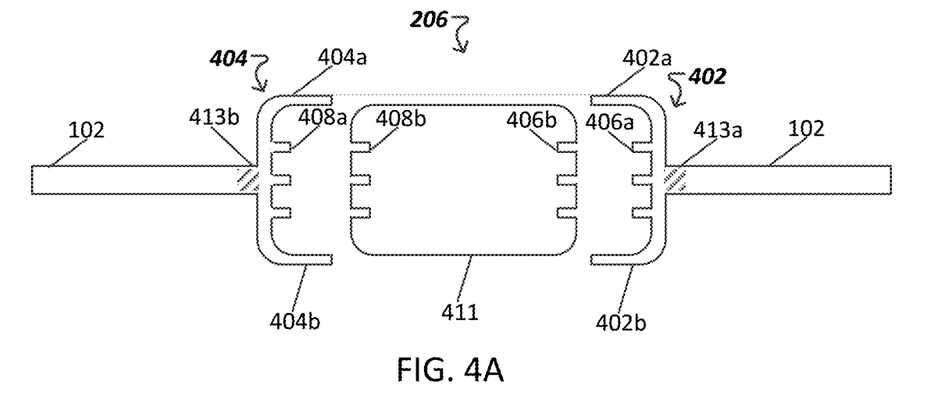
FIG. 4A shows a plan view of cable integrated power converter according to yet another embodiment.
Figure 4B:
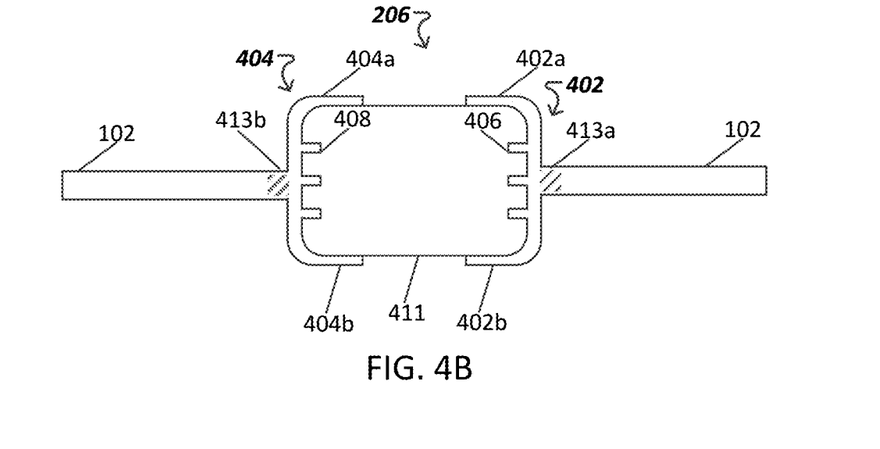
FIG. 4B shows a plan view of cable integrated power converter according to yet another embodiment.

As yet another example, FIGS. 4A and 4B show an overhead view of a cable integrated power converter according to another embodiment. In the illustrated embodiment of FIG. 4A, the power converter's electronics are contained within a power converter cartridge 411 configured for being removably secured between brackets 404 and 402 disposed at ends of sections of the trunk cable 102. According to various embodiments, the power converter cartridge 411 is configured for being connected via positive and negative terminals (not shown) to a photovoltaic module 11-18 as described above.

Each of brackets 404 and 402 is configured for removable attachment to opposite ends of the power converter cartridge 411. For example, bracket 404 includes protruding elements 404a and 404b for removably attaching trunk cable 102 to the power converter cartridge 411. Similarly, bracket 402 includes protruding elements 402a and 402b for removably attaching trunk cable 102 to the power converter cartridge 411. As shown in FIGS. 4A and 4B, the shape of the edges of brackets 404 and 402 correspond to the shape of the edges of the power converter cartridge 411. Inserting the power converter cartridge 411 into bracket 402 secures the power converter cartridge 411 between elements 402a and 402b. Similarly, inserting power converter cartridge 411 into bracket 402 secures the power converter cartridge 411 between elements 404a and 404b. The protruding elements 404a,b; 402a,b may be configured to partially surround and engage the power converter cartridge 411 using a press-fit configuration, snap-fit configuration, a latch, a magnetic attachment, or by other suitable means.

FIG. 4A shows the power converter cartridge 411 disconnected from trunk cable 102, while FIG. 4B shows the power converter cartridge 411 connected and secured to the trunk cable 102. As illustrated in the figures, the trunk cable 102 is electrically connected to the brackets 404 and 402 (e.g., with weather-proof rubber grommets 413a, 413b to secure the connection). The brackets 404, 402 are configured for electrically connecting the power converter cartridge 411 to the trunk cable 102 via projecting terminals 406a and 408a. In particular, the projecting terminals 406a and 408a are configured for insertion into corresponding terminals 406b and 408b of the power converter cartridge 411. As can be appreciated form FIGS. 4A and 4B, inserting the terminals 406a into the terminals 406b establishes an electrical connection between a first section of the trunk cable 102 and the power converter cartridge 411, while inserting the terminals 408a into the terminals 408b establishes an electrical connection between a second section of the trunk cable 102 and the power converter cartridge 411. In addition, the connected terminals 408 and 406 help secure the power converter cartridge 411 to the brackets 402, 404 and trunk cable 102.

In one embodiment, the corresponding pairs of power converter cartridge 411 and trunk cable 102 connection terminals 408a/408b, and 406a/406b are configured to provide dedicated electrical connections between the power converter 206, adjacent power converters 206, and the above-described grid interface unit 106. For example, in one embodiment, the three prongs of the electrical connections 408a,b and 406a,b shown in FIGS. 4A and 4B represent a power connection line, a fault detection line, and a synchronization line, respectively. However, as will appreciated from the description herein, the connection terminals may be integrated into a single multi-pin interface or any other suitable electrical connection interface. Indeed, in various other embodiments, the power converter cartridge 411 and housing 208 may include a single connector or multiple connecters (e.g., four connecters, five connecters and/or the like). Additionally, in further embodiments, the connecters may comprise flat electrical contacts that are merely in contact with one another.

Figure 5A:
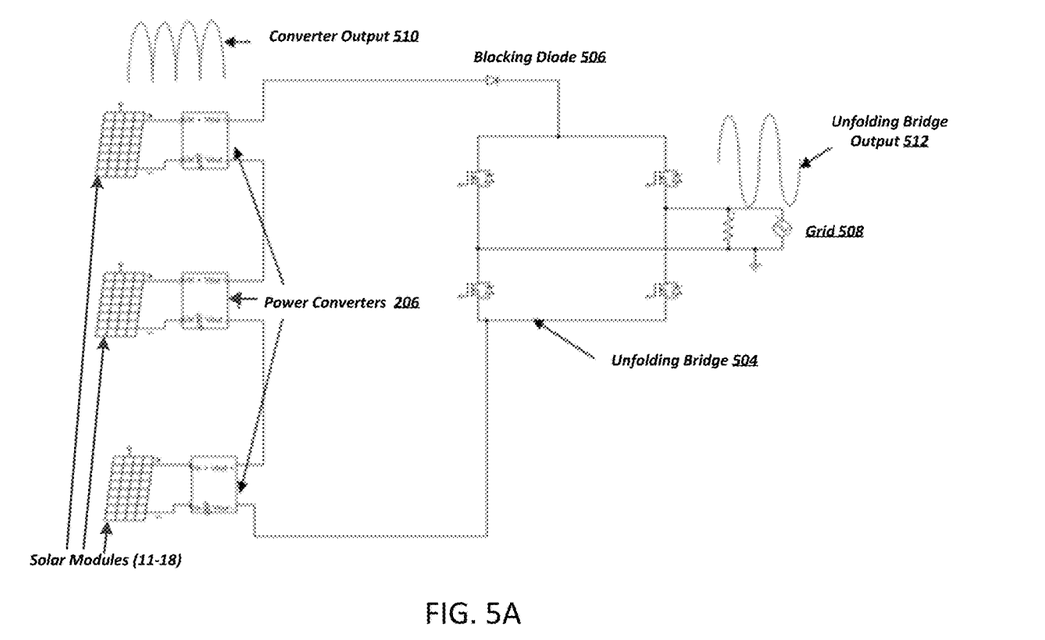
FIG. 5A is an exemplary schematic diagram of a cabling system according to one embodiment.

FIG. 5A shows a schematic circuit diagram of a cable integrated solar inverter system according to one embodiment. As indicated in FIG. 5a, the photovoltaic modules 11-18 are each connected to a respective power converter 206. As will be appreciated from the description herein, each power converter 206 may be a cable integrated power converter having any of the various configuration described herein (e.g., as shown in FIGS. 2A-4B). In the illustrated embodiment, the power converters 206 are connected to one another in series and are synchronized to ensure that the output of each power converter 206 is in-sync with the other converters 206 (as described in relation to FIG. 8A-B). The output of each power converter 206 is added to produce a power converter output 510, as indicated in FIG. 5A. In one embodiment, the output of each power converter is similar to the output 510. The synchronization ensures that when the output of each converter is added, the wave form 510 is maintained.

In one embodiment, the DC power from a photovoltaic module 11-18 is delivered to a buck converter within each power converter 206. As explained in greater detail below, the buck converter is configured to produce a half-sine wave (or rectified wave). The buck converters each utilize pulse width modulation and an output filter to produce a half-sine wave from the input DC power signal. As the power converters 206 are connected in series, the output voltages are added to produce a half-sine wave at the end of the trunk cable that is the sum of the voltage output from each power converter. Notably, this configuration allows the use of smaller components that are rated for lower voltage than would ordinarily be required to convert or invert the same amount of power. For example, this configuration may utilize smaller components rated to block only the voltage on the photovoltaic modules 11-18. In other words, the components do not necessarily have to be rated to block the entire voltage of the string, which allows for the use of lower cost components (e.g., in comparison to a design requiring a higher rating).

Figure 6:
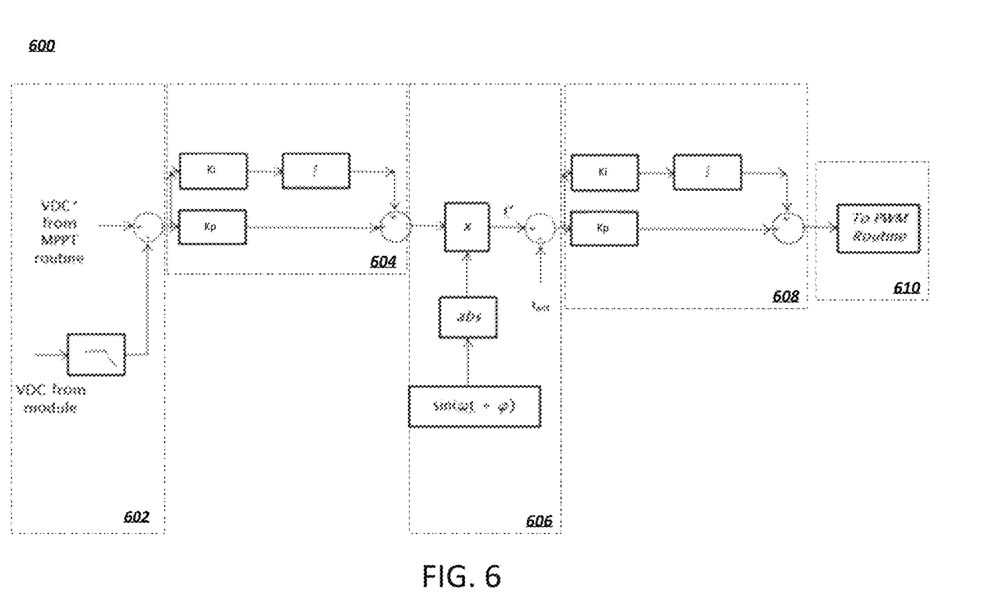
FIG. 6 is an exemplary control system block diagram according to one embodiment.

According to various embodiments, the power converters 206 are configured to independently control their output to draw maximum power from their respective photovoltaic modules while also maintaining a smooth half-sine wave shape (e.g., sine wave without significant electrical fluctuations or spikes). FIG. 6 shows a circuit diagram for a power converter 206 according to one embodiment. The boxes marked in phantom within FIG. 6 show different circuit operation steps associated with control system 600. The voltage from each photovoltaic module is first measured and filtered, and the difference between the voltage at the panel and the known maximum power point voltage (Vmp) is calculated circuit operation step 602. For example, at circuit operation step 602, the control system 600 receives a voltage reading from the photovoltaic module and then subtracts the received voltage from the voltage determined from a maximum power point tracking (MPPT) routine. The output from circuit operation step 602 is then fed into a proportional-integral (PI) controller as shown in circuit operation step 604.

The PI controller multiplies the determined difference (e.g., error) by a first constant gain and a second gain multiplied by an integral term that increases over time at circuit operation step 604. In turn, first and second products above are then added. The added sum above is then multipled by a rectified sine-wave to modulate the sum into a rectified sine wave shape at circuit operation step 606. The product of this multiplication is then compared to the actual output current flowing through the string of power converters and the trunk cable circuit operation step 606. For example, the actual current flow through the string of power converters is subtracted from the current determined at circuit operation step 606. The difference between these two signals represents an error signal, which is fed into a second PI controller at circuit operation step 608.

The second PI controller is generally similar to the PI controller described above. The output of the second PI controller is then fed into the power width modulation (PWM) software routine, which continuously modulates switching transistors in the power converters to generate a smooth half-sine output at circuit operation step 610. The two level filtering process optimizes the voltage and current independently and simultaneously. This ensures that the control system achieves the smooth desirable power results in a fast and an efficient manner. Once the control system 600 achieves a steady state the power output remains optimized. When unexpected events that affect the power output occur the system will automatically adjust in a manner similar to the described above. As will be appreciated from the description herein, a control system similar to exemplary control system 600 may be implemented in each power converter (e.g., power converter cartridges 211, 311, and 411).

Referring back to FIG. 5A, a blocking diode 506 is connected in series with the power converters 206 to prevent electrical signals from propagating towards the power converters 206 and photovoltaic modules. The power converter output 510 is then transmitted to an unfolding bridge 504 for conversion to a pure or a full AC signal.

In the illustrated embodiment of FIG. 5A, the unfolding bridge 504 is housed within the grid interface unit 106

Figure 5B:
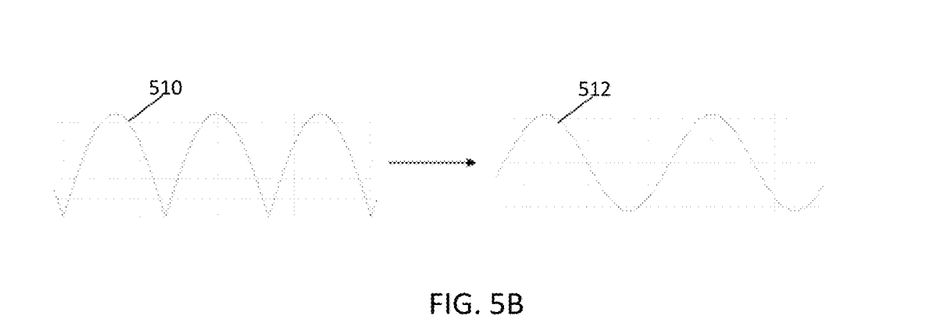
FIG. 5B depicts an exemplary electrical signal transformation at an exemplary unfolding bridge according to one embodiment.

(shown in FIG. 1B). Generally, the unfolding bridge is configured to convert the output signal 510 generated collectively by the power converters 206 into an AC power signal (e.g., suitable for supply to a power grid). In particular, as shown in FIG. 5B, the unfolding bridge 504 is configured to convert the half-sine wave 510 output by the power converters 206 into a full sine wave 512 (illustrated as the unfolding bridge output). The unfolding bridge output 512 is then transmitted back to a power grid 508.

According to one embodiment, the circuitry within the grid interface unit 106 functions as an H-bridge configured to reverse the polarity of the power converter output signal 510 on alternate sine pulses. Reversing the polarity, in turn, converts the rectified half-sine wave shape 510 into a pure sine wave shape 512 suitable for delivery to a power grid. It is understood that the term "sine wave" may be used to refer to a cosine wave, a shifted sine wave, a shifted cosine wave, any sinusoidal signal, any sinusoidal combination of signals or the like. Similarly, the term "half-sine wave" may refer to a half-cosine wave, a shifted half-sine wave, a shifted half-cosine wave, any half-sinusoidal signal, half-sinusoidal combination of signals or the like.

Referring back to the illustrated embodiment of FIG. 1B, the grid interface unit 106 (including its unfolding circuitry) is located remotely from the power converters 206 and the photovoltaic modules 11-18. For example, while the power converters 206 and photovoltaic modules 11-18 may be located in an outdoor environment, the grid interface unit 106 may be located in an indoor environment or secured within a separate weather resistant housing.

Figure 7:
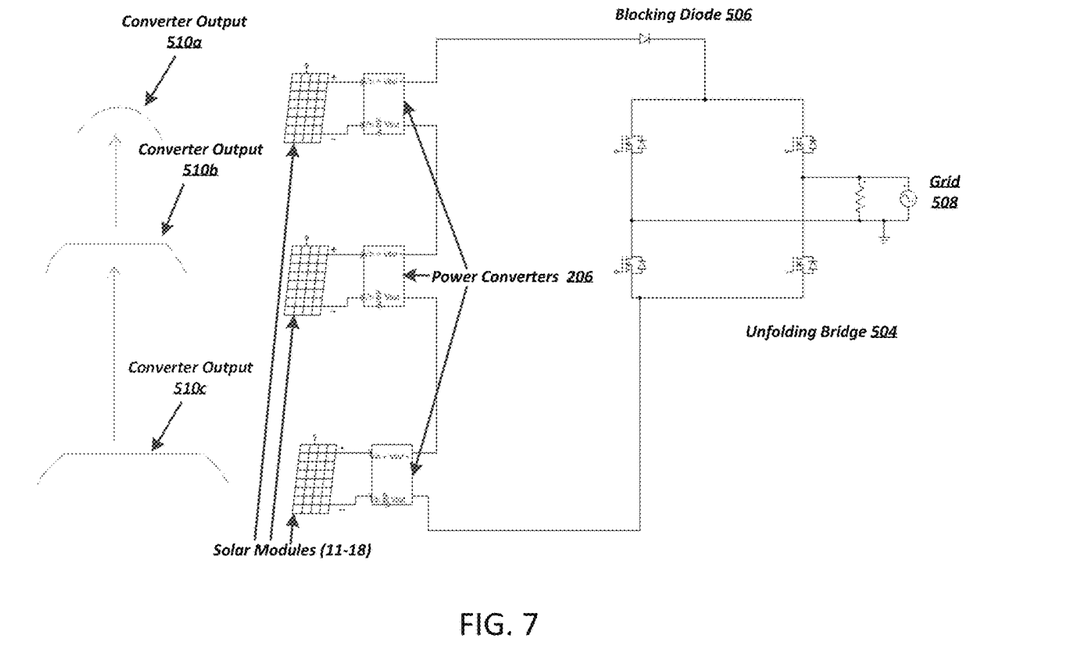
FIG. 7 is an exemplary schematic diagram of a cabling system according to another embedment.

FIG. 7 shows a schematic circuit diagram of a cable integrated solar inverter system according to a different embodiment. In this illustrated embodiment, the power converters 206 collectively construct an output 510, similar to FIG. 5A. However, in this embodiment a first power converter may produce the base portion of output 510, while a second power converter produces a middle portion of output 510 and a third power converter produces a top portion of output 510. The output from the 3 power converters may be added to produce power converter output 510. For example, in order to construct the rectified (half-sine) wave 510, a first power converter 206 generates base portion 510c of the rectified (half-sine) wave, a second power converter 206 generates middle portion 510b of the rectified (half-sine) wave, and a third power converter 206 generates top portion 510a of the rectified (half-sine) wave. In the illustrated embodiment, the power converters 206 are connected to one another in series and are synchronized to ensure that the output of each power converter 206 is in-sync with the other converters 206. Therefore the signals 510a, 510b and 510c are added to one another to create the rectified (half-sine) wave 510. In the illustrated embodiment, the converters output 510 is constructed by three different converters 206. However, in other embodiments the converters output 510 may be constructed by more or less power converters 206. For example, the output 510 may be constructed by 2, 5, or 10 power converters 206.

Although the photovoltaic system 7 has been set described as a single phase 120 volt 60 hertz electrical system, it should be understood that the present invention is suitable for use with other types of electrical systems including 240 volt 50-60 hertz grid systems. In addition, it should be understood that the present invention is suitable for with other types of renewable energy sources such as windmills, water wheels, geothermal and is suitable for with other types energy storages devices such as fuel cells, capacitor banks and/or the like.

According to various embodiments, communication and synchronization data between the grid interface unit 106 and power converters 206, may be sent as signals along one combined synchronization and communications wire in the trunk cable 102. In general, in order for the system described in the above to function correctly, the output power 510 must be correctly synchronized to the grid as described in relation to FIGS. 5-7. In various embodiments, the grid interface unit 106 is configured to synchronize the output power 510 to the grid. For example, in one embodiment, the grid interface unit 106 is configured to monitor the grid 508 and detect the zero crossing point in grid 508's AC voltage. The grid interface unit 106 then broadcasts a synchronization signal in the form of a square wave on a dedicated synchronization wire, in trunk cable 102, to each of the power converters 206 connected to the trunk cable. Each of the power converters 206 are configured to synchronize each of their individual outputs to output 510 by monitoring the incoming synchronization signal square wave broadcast by grid interface unit 106 on the dedicated synchronization wire in trunk cable 102. The current or voltage on the communications wire is sourced by the grid interface unit 106 and can vary between a high and low state. Each power converter 206 is configured to detect the zero crossing point of grid 508 by sensing a transition from high to low (or alternatively low to high) in the synchronization signal. As each power converter 206 receives the synchronization signal, each power converter is configured to begin creating the half sine voltage signal in synchronization with the other power converters and grid 508.

In addition to the synchronization among the power converters, there also is a requirement to exchange serial data or command data between the power converters 206 and the grid interface unit 106. In some embodiments, this command data is used for system monitoring and control and may include requests for status of the power converters 206, addressing commands of the power converters 206, requests for voltage, current, or power levels being measured by the power converters 206, and/or fault or shutdown commands. In some embodiments this data is transferred through a dedicated serial communications line, in addition to the line used for synchronization. However, it is advantageous to combine the synchronization line and the serial communications line into one line or wire, to reduce the wiring needs and overall system cost.

In one embodiment, the serial communication signal and the synchronization signal are combined into a single signal on one wire by reserving certain periods of time for the synchronization signal, with the remainder of the time reserved for serial data transmission.

Figure 8A:
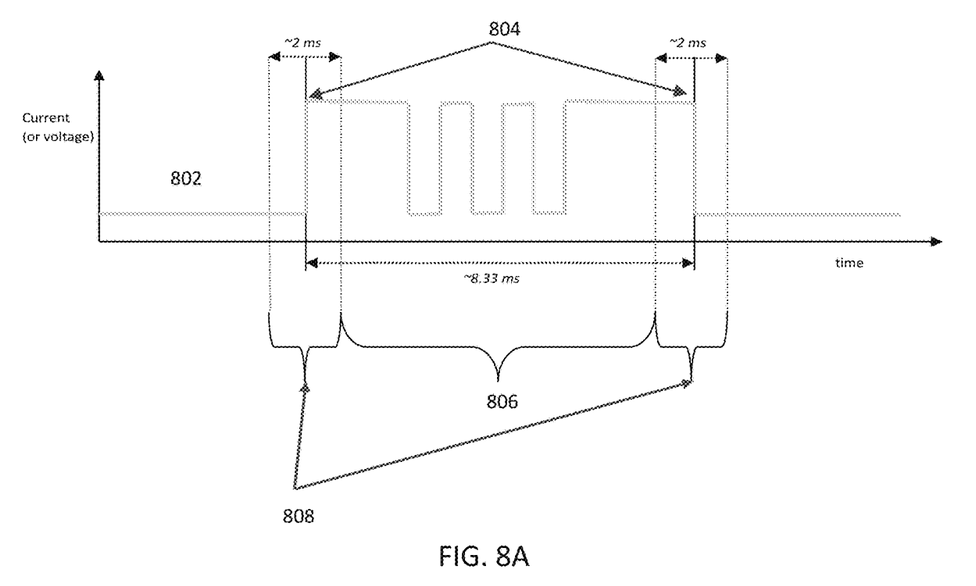
FIG. 8A depicts an exemplary combined synchronization and serial communication electrical signal.

FIG. 8A depicts an exemplary combined synchronization and serial communication electrical signal 802 broadcast on a combined synchronization and communication line. For example, grid 508 may operate at a nominal 60 Hz rate, thus the zero crossing signal happens twice per cycle at approximate 8.33 millisecond intervals. The synchronization signal produced by grid interface unit 106 will thus switch between high and low at approximately every 8.33 millisecond at as depicted at times 804. The power converters 206 will observe guard bands 808 around the zero crossing transition during which no data can be sent down the line. For example, this guard band can be approximately 2 milliseconds around each zero crossing. During bands 808 surrounding each transition in the signal, the power converters 206 are configured to monitor the combined serial communication and synchronization signal to measure the timing of each transition. This transition is used to synchronize the power converters 206 to the power line to produce a synchronized output, such as output 510. Outside of the guard bands 808, in communication time 806, the grid interface unit 106 sends other relevant or command data to the power converters 206.

In one embodiment, the synchronization signal is included as part of a communication packet. For example the grid interface unit may be configured to utilize a standard Universal Asynchronous Receiver Transmitter (UART) Non Return to Zero Encoding (NRZ) physical layer and a link layer carrying a packet of information.

Figure 8B:
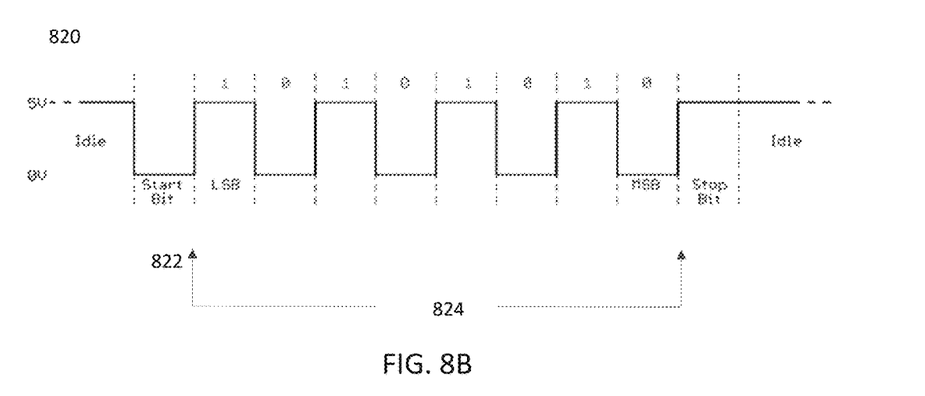
FIG. 8B depicts a serial representation of an exemplary combined synchronization and serial communication electrical communication packet.

FIG. 8B depicts a serial representation of an exemplary combined synchronization and serial communication electrical communication packet 820 utilizing a standard UART.

For example, a first zero crossing synchronization happens at the first edge of the Start Bit 822, during the change from Idle to Start Bit. In some examples, a microcontroller I/O port in each power converter 206 is configured both as an external edge triggered interrupt and a as a UART Receiver Port. This allows the first edge change, Start Bit 822, of combined packet 820 to the power converters 206, to be used as a synchronization trigger for the power converters 206 to start outputting a rectified sine wave. For example, an external Edge Interrupt Service Routine (ISR) located in each power converter 206 may begin the process of the rectified sine wave building. Furthermore, because the microcontroller I/O port is also configured as a UART Receiver, all bytes 824, corresponding to the command data from the grid interface unit to the power converters 206, can also be received.

Furthermore, inside of the ISR, the edge interrupt capability is disabled for a certain period of times, such as approximately 8 ms in the case of a 120 Hz half sine waves, so that all the bytes of the packet can arrive without falsely triggering zero crossing signaling. In some examples, the packet of information is smaller than the period of the rectified sine wave. This results in an idle time allowing the power convert 206 to enable the edge interrupt again or to allow the reserved time for synchronization signal. In some examples, to respond to messages sent by the grid interface unit 106, the power converters 206 can respond by either sending pulses of current or voltage along the same wire at a designated period within the cycle, or across a different wire in trunk cable 102.

While this specification contains many specific embodiment details, these should not be construed as limitations on the scope of any inventions described herein, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single product or packaged into multiple products.

Thus, particular embodiments of the subject matter have been described. Other embodiments are within the scope of the specification above. In some cases, the actions recited in the specification can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the application.

That which is claimed:

1. A solar inverter system for converting direct current (DC) power from a plurality of photovoltaic modules into alternating current (AC) power, the solar inverter system comprising:
   a plurality of photovoltaic modules;
   a plurality of distributed power converters configured for being connected in series, wherein each of the distributed power converters is configured for being electrically connected to a respective photovoltaic module of the plurality of photovoltaic modules, and wherein each of the distributed power converters comprises a buck converter configured for converting a DC power signal received from the a respective photovoltaic module into a rectified sine wave signal; and
   a grid interface unit configured to be electrically connected to the power converters and to a power grid, wherein the grid interface unit is configured to convert the rectified sine wave signal produced by the plurality of converters to an AC signal for supply to the power grid;
   wherein each photovoltaic module of the plurality of photovoltaic modules is configured for being electrically connected to a respective distributed power converter of the plurality of distributed power converters, and wherein the photovoltaic modules of the plurality of photovoltaic modules are not connected to one another in series.

2. The solar inverter system of claim 1, wherein the grid interface unit comprises an unfolding bridge for conversion from the rectified signal to the AC signal for supply to the power grid.

3. The solar inverter system of claim 2, wherein the unfolding bridge comprises circuitry configured to function as an H-bridge to reverse polarity of the rectified sine wave signal on alternate pulses to an AC compatible signal.

4. The solar inverter system of claim 1, wherein the rectified sine wave signal comprises a half-sine wave.

5. The solar inverter system of claim 4, wherein the half-sine wave comprises a half-wave of one of at least a sinusoidal wave including a sine wave, a cosine wave, a shifted sine wave, or a shifted cosine wave.

6. The solar inverter system of claim 1, wherein each of the one or more power converters each produces a half-sine wave signal.

7. The solar inverter system of claim 6, wherein the power converters are synchronized with each of the plurality of power converters and the grid interface unit to produce each respective half-sine wave signal and configured such that their respective half-sine wave signals are added in the grid interface unit to form the rectified sine wave signal of a combined output voltage from the plurality of power converters.

8. The solar inverter system of claim 1, wherein the grid interface unit is configured to synchronize the power converters and communicate with the power converters through a combined synchronization and communication line in the trunk cable.

9. The solar inverter system of claim 1, wherein the power converters are each configured to produce an individual part of a rectified sine wave signal, such that when combined the individual parts form a full rectified sine wave signal.

10. The solar inverter system of claim 1, wherein the power converters are synchronized by a combined synchronization and communication signal produced by the grid interface unit, wherein the combined signal includes communication bits.

11. The solar inverter system of claim 1, wherein the grid interface unit further comprises a fault detection system, a monitoring system, a synchronization system, and a communication system.

12. The solar inverter system of claim 1, further comprising a blocking diode connected in series with the plurality of power converters, such that electrical signals are prevented from propagating towards the plurality of power converters and the connected photovoltaic modules.

13. The solar inverter system of claim 1, wherein the power converters and the grid interface unit are connected by a trunk cable.

14. The solar inverter system of claim 13, wherein the power converters are embedded in the trunk cable.

15. The solar inverter system of claim 13, wherein each of the plurality of power converter comprises a weather proof cartridge and a housing attached to the trunk cable, the weather proof cartridge configured for removable insertion into the housing.

16. The solar inverter system of claim 15, wherein each power converter housing is embedded in the trunk cable.

17. The solar inverter system of claim 13, further comprising weatherproof housing for housing one or more of the plurality of power converters.

18. The solar inverter system of claim 13, wherein the grid interface unit is located remotely from the plurality of power converters.

* * * * *